United States Patent
Jann et al.

(10) Patent No.: US 7,979,749 B2
(45) Date of Patent: Jul. 12, 2011

(54) METHOD AND INFRASTRUCTURE FOR DETECTING AND/OR SERVICING A FAILING/FAILED OPERATING SYSTEM INSTANCE

(75) Inventors: Joefon Jann, Ossining, NY (US); Pratap Chandra Pattnaik, Ossining, NY (US); Ramanjaneya Sarma Burugula, Peekskil, NY (US)

(73) Assignee: International Business Machines Corporation, Armonk, NY (US)

( * ) Notice: Subject to any disclaimer, the term of this patent is extended or adjusted under 35 U.S.C. 154(b) by 1172 days.

(21) Appl. No.: 11/599,272

(22) Filed: Nov. 15, 2006

(65) Prior Publication Data
US 2008/0115012 A1    May 15, 2008

(51) Int. Cl.
*G06F 11/00* (2006.01)
(52) U.S. Cl. ............ 714/38.1; 714/47; 714/48; 714/37; 714/30; 710/8; 713/164; 709/1; 709/223
(58) Field of Classification Search .............. 714/37, 714/47, 48; 709/1, 223; 710/8; 713/164
See application file for complete search history.

(56) References Cited

U.S. PATENT DOCUMENTS

| | | | |
|---|---|---|---|
| 6,199,179 B1 * | 3/2001 | Kauffman et al. ............ 714/26 |
| 6,216,132 B1 | 4/2001 | Chandra et al. | |
| 6,266,716 B1 | 7/2001 | Wilson et al. | |
| 6,505,245 B1 * | 1/2003 | North et al. ................. 709/223 |
| 6,549,916 B1 | 4/2003 | Sedlar | |
| 6,728,715 B1 | 4/2004 | Astley et al. | |
| 6,754,664 B1 | 6/2004 | Bush | |
| 6,829,639 B1 | 12/2004 | Lawson et al. | |
| 6,910,070 B1 | 6/2005 | Mishra et al. | |
| 6,910,160 B2 * | 6/2005 | Bajoria et al. ............... 714/45 |
| 7,539,986 B2 * | 5/2009 | Grobman ...................... 718/1 |
| 7,558,986 B2 | 7/2009 | Abe | |
| 2002/0059380 A1 | 5/2002 | Biliris et al. | |
| 2002/0089526 A1 | 7/2002 | Buxton et al. | |
| 2002/0124165 A1 * | 9/2002 | Smith et al. .................. 713/2 |
| 2002/0124215 A1 * | 9/2002 | Austen et al. ................ 714/57 |
| 2002/0129110 A1 | 9/2002 | Liu et al. | |
| 2003/0126202 A1 * | 7/2003 | Watt ........................... 709/203 |
| 2003/0131039 A1 * | 7/2003 | Bajoria et al. ............... 709/1 |
| 2003/0204780 A1 * | 10/2003 | Dawkins et al. ............ 714/24 |
| 2005/0081212 A1 * | 4/2005 | Goud et al. ................. 718/107 |
| 2005/0091354 A1 * | 4/2005 | Lowell et al. ............... 709/223 |
| 2005/0172279 A1 | 8/2005 | Cook et al. | |
| 2005/0235007 A1 | 10/2005 | Abali et al. | |
| 2006/0005085 A1 | 1/2006 | Zunino et al. | |

(Continued)

FOREIGN PATENT DOCUMENTS
EP    1 970 807 A1    9/2008

OTHER PUBLICATIONS

Irving, "Paritioning Implementation for IBM @server p5 Servers" Feb. 2005, IBM, third edition, pp. 1-342.*

(Continued)

*Primary Examiner* — Michael C Maskulinski
*Assistant Examiner* — Jeison C Arcos
(74) *Attorney, Agent, or Firm* — McGinn IP Law Group, PLLC

(57) ABSTRACT

A method and infrastructure for a diagnosis and/or repair mechanism in a computer system, that includes an auxiliary service system running on the computer system.

25 Claims, 6 Drawing Sheets

Steps taken by the <u>Ambulance LPAR & its OS</u>

U.S. PATENT DOCUMENTS

2006/0085792 A1* 4/2006 Traut ............................ 718/100
2008/0115012 A1 5/2008 Jann et al.
2008/0126780 A1 5/2008 Rajkumari et al.
2009/0172471 A1 7/2009 Zimmer et al.

OTHER PUBLICATIONS

Quintero, "HACMP V5.3, Dynamic LPAR, and VIrtualization", 2005, IBM Red Books, pp. 1-60.*

Huang, "A case for High Performance computing with Virtual Machines", 2006, ACM, p. 1-10.*

Thefreedictionary, "Vitualization Definition" Thefreedictionary, p. 1.*

Wikipedia, "Concurrent computing" Wikipedia, p. 1-5.*

Wikipedia, "Concurrent multitasking" Wikipedia, p. 1-5.*

Cartwright, "What is Concurrent Programming", Jan. 2000, www.cs.rice.edu, p. 1-5.*

Thefreedictionary, "Virtualization Definition", Thefreedictionary, Aug. 2010, p. 1.*

Wikipedia, "Concurrent computing" Wikipedia, Aug. 2010, p. 1-5.*

Wikipedia, "Concurrent multitaskin" Wikipedia, Aug. 2010, p. 1-5.*

Written Opinion of the International Searching Authority dated Nov. 8, 2010.

Office Action dated Jun. 23, 2010 for U.S. Appl. No. 12/023,185.

* cited by examiner

FIGURE 1 : Exemplary basic block diagram of an SMP with LPARs

FIGURE 2 : Steps taken by an OS Instance which wants to use the Ambulance LPAR's services FIGURE 3 : Steps to be taken by the Hypervisor FIGURE 4: Steps taken by the Ambulance LPAR & its OS

METHOD AND INFRASTRUCTURE FOR DETECTING AND/OR SERVICING A FAILING/FAILED OPERATING SYSTEM INSTANCE

BACKGROUND OF THE INVENTION

1. Field of the Invention

The present invention generally relates to detecting, diagnosing, and/or repairing a failing or failed operating system. More specifically, in an exemplary embodiment, for an OS (Operating System) running in a Logically PARtitioned system, a Service (ambulance) LPAR is created which can gain access to the resources of a failing OS-instance in another LPAR in the same SMP (Symmetric Multi-Processor) server, and can diagnose and fix the errors in the failing OS-instance without affecting the functioning of other LPARs in the SMP.

2. Description of the Related Art

Currently, when an OS-instance fails (e.g. hangs or crashes), the customer has to collect the OS system dump and send it over to the OS technical support team, who will then diagnose the problem using the dump. The problem with this approach is that the process is time-consuming and the OS support team may not have access to all the information of the OS-instance, in which case they will have to go through multiple iterations of system dump collection and analyses. It will be beneficial to both the customers and to the OS-provider (e.g., IBM® for the AIX® OS) if an online analysis of the failing OS-instance can be done, and even better if it can be done automatically.

Moreover, from an information technology (IT) infrastructure management point of view, it is desirable to have server management and maintenance done as automatically as possible. The requirements of a Lights-out data center environment, explained in more detail below, dictate that the amount of human interventions required to maintain a server should be minimal. The above-described conventional procedure for diagnosing a failed OS-instance is human intensive and hence is not conducive to the operation of a highly efficient, effective, and productive data center.

Thus, a need exists to provide a method of automatically detecting a failing OS-instance and, preferably, performing an automatic diagnosis and, even better, performing an automatic repair of the failing OS-instance.

SUMMARY OF THE INVENTION

In view of the foregoing, and other, exemplary problems, drawbacks, and disadvantages of the conventional systems, it is an exemplary feature of the present invention to provide a structure (and method) in which a failing or failed OS-instance can be automatically detected can receive automatic diagnosis, repair, and/or annunciation of a problem requiring operator assistance, along with a report of the diagnosis results.

It is also an exemplary feature of the present invention to provide a structure and method for reducing the amount of time needed to diagnose a failing OS-instance.

It is also an exemplary feature of the present invention to improve OS availability.

It is also an exemplary feature of the present invention to improve service of Lights-Out data centers.

It is also an exemplary feature of the present invention to provide an automated diagnosis mechanism for an operating system running on a computer system that preferably can also automatically repair the operating system and/or provide an indication of a distressed operating system and a report of the diagnosis.

Therefore, in a first exemplary aspect, the present invention discloses a diagnosis mechanism for a computer system, including an auxiliary service system capable of diagnosing an operating system running on the computer system.

In a second exemplary aspect, the present invention teaches an automated method of diagnosis in a computer system capable of supporting a plurality of operating system instances, each operating system instance owning or sharing one or more processing elements, a certain amount of memory, and one or more input/output (I/O) devices, the method including running an auxiliary service system on the computer system, the auxiliary service system capable of diagnosing an operating instance running on the computer system.

In a third exemplary aspect, the present invention teaches a signal-bearing medium tangibly embodying a program of machine-readable instructions executable by a digital processing apparatus to perform an automated method of diagnosis in a computer system, including running an auxiliary service system on the computer system, the auxiliary service system capable of diagnosing an operating system running on the computer system.

In a fourth exemplary aspect, the present invention teaches a computer system, including means for setting up and maintaining a plurality of operating system instances, each operating system instance owning or sharing one or more processing elements, a certain amount of memory, and one or more input/output (I/O) devices; and an automatic diagnosis mechanism capable of at least one of diagnosing an operating instance running on the computer system, repairing an operating system instance running on the computer system, annunciating that an operating system instance running on the computer system is requesting servicing, and providing a report of diagnosing the operating system instance.

In a fifth exemplary aspect, the present invention teaches a method of at least one of operating a data center and using a data center, including at least one of transmitting data to a computer system in the data center and receiving data from the computer system, wherein the computer system in the data center has provisions to set up and maintain a plurality of operating system instances, each operating system instance owning or sharing one or more processing elements, a certain amount of memory, and one or more input/output (I/O) devices, the computer system further comprising an automatic diagnosis mechanism capable of at least one of diagnosing an operating instance running on the computer system, repairing an operating system instance running on the computer system, annunciating that an operating system instance running on the computer system is requesting servicing, and providing a report of diagnosing the operating system instance.

As can be understood from the above discussion and even more so from the detailed discussion below, advantages provided by the present invention include:

1) A reduction in the amount of manual (human) diagnosis of a failing OS-instance;

2) A reduction in the amount of time needed to diagnose a failing OS-instance;

3) An improvement in OS availability; and

4) Automatic problem diagnosis, reporting, and problem-fixing features for Lights-Out data centers, which are becoming increasingly prevalent.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF AN EXEMPLARY EMBODIMENT OF THE INVENTION

Figure 1:
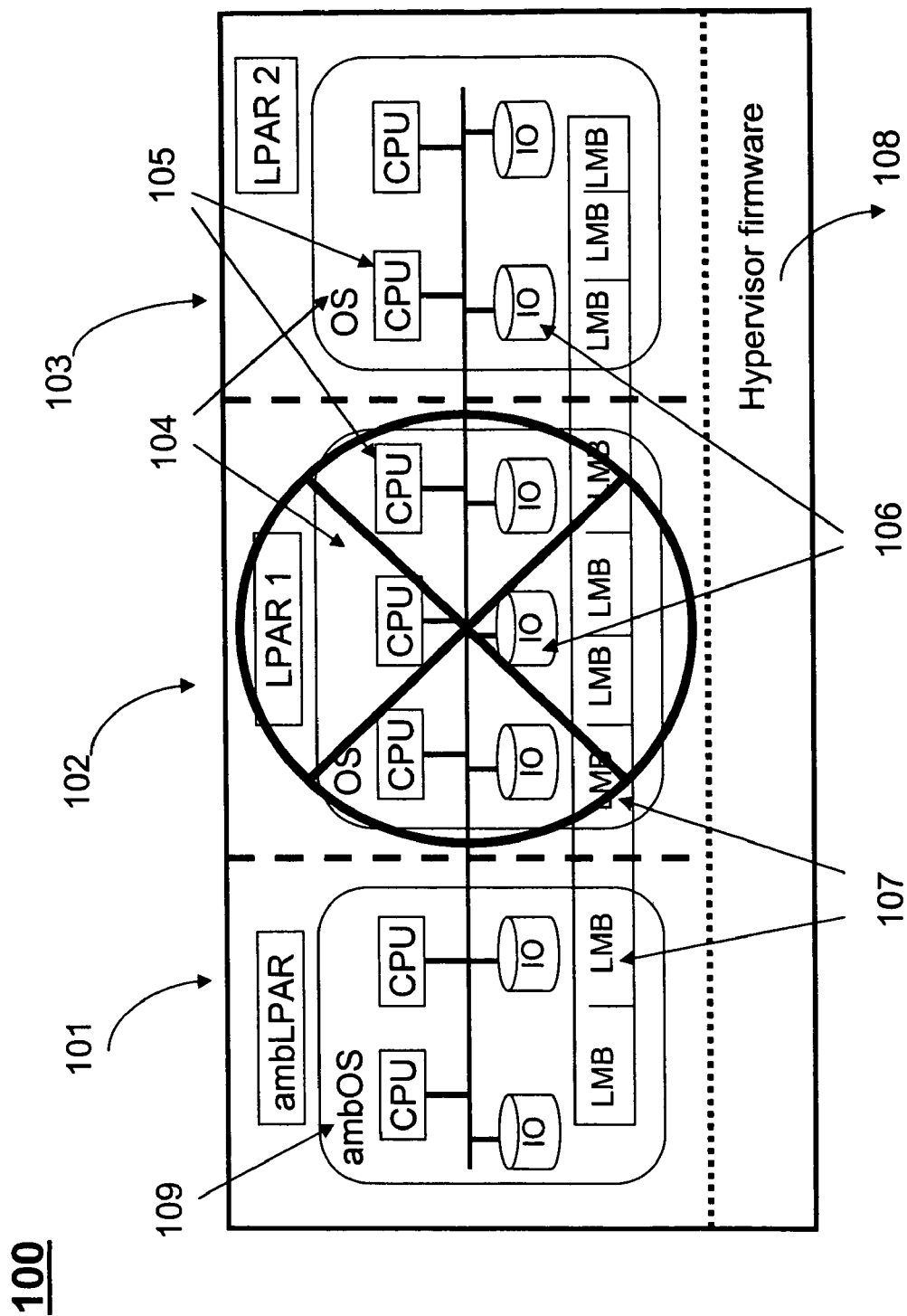
FIG. 1 shows an exemplary basic block diagram of an SMP 100 using LPARs into which an implementation of the present invention has been incorporated.

Referring now to the drawings, and more particularly to FIGS. 1-6, an exemplary embodiment will now be described.

Although the concepts of the present invention are described below in a specific environment for which it was developed, as an example of an SMP system into which the present invention can be incorporated, the concepts are more generic, and the present invention is not intended as limited to this specific example and environment. A key aspect of the present invention is that it teaches a method whereby a failing/failed operating system can be detected and, preferably, announced to an outside party, diagnosed, and, possibly even automatically repaired, depending upon the nature of the failure.

As an analogy of the present invention, the mechanism described below can be compared to a scenario wherein a person susceptible to a medical condition, such as epilepsy, might tap someone on the shoulder to alert that person of a possible pending fainting incident. The person whose shoulder is tapped would then attempt to diagnose the seriousness of the incident, including possibly calling an ambulance to provide more sophisticated medical assistance to the fainted person. Thus, the descriptive "ambulance" in the present invention is analogous to this concept of providing assistance to an OS-instance that is about to "faint", or has already "fainted."

In the following discussion, the term "failed" and "failing" are used to convey that an OS-instance, for example, is hung or has crashed. But this terminology is intended to be more generally interpreted as meaning that the OS-instance can recognize that it is in "distress" and requiring outside aid, even if it has not yet reached a stage of hanging up or of crashing completely or that an agent other than the operation system can detect that the OS-instance is in distress.

The LPAR (Logical PARtitioning) capability in IBM® System p servers provides an opportunity to address the issues discussed above, by providing capability that enables an online analysis of a failed OS-instance, using an ambulance service LPAR as described in this invention.

IBM® System p servers have had LPAR capability since POWER4® processor-based systems, which became available in 2001. This LPAR capability allows more than one OS-instance to concurrently run on the same physical SMP (Symmetric Multi-Processor) server with resource isolation and protection across the LPARs. With the Dynamic LPAR and Micro-Partitioning capabilities support in AIX® on POWER5® and follow-on machines, it is relatively straight forward to provide a small LPAR in the SMP which can analyze the causes of OS failure, and in some cases, fix the problems when another OS-instance in the SMP crashes or hangs.

This invention teaches a mechanism and method to improve serviceability of an SMP server by providing an auxiliary service system (referred to herein as an Ambulance service Logical PARtition, or ambLPAR for short) that can automatically diagnose a failed OS-instance in the same SMP.

The present invention can be used as a key technology towards developing effective "Lights-out/Touchless Systems". This term refers to systems typically managed remotely without the ability of the system administrators to have physical access to the system in any reasonable time frame. These "Lights-out" systems are viewed as the next generation of the IT infrastructure deployment, which enables one to take the advantage of labor arbitrage using skills from the BRIC (Brazil, Russia, India, China) countries, while placing the servers in geopolitical stable countries like Germany, England, the US, etc. For example, this hybrid approach is vigorously pursued by IT leaders worldwide, including SAP® (of Germany, for their business software as Service outsourcing), IBM®, Infosys® (India), TCS® (India) and a number of University-based companies in China, etc.

FIG. 1 exemplarily illustrates an embodiment of the present invention, wherein SMP 100 has three LPARs 101, 102,103, each LPAR having an OS 104, at least one CPU 105, at least one I/O interface 106, and a portion of memory 107. Hypervisor firmware 108 provides resource isolation across the LPARs. That is, the Hypervisor 108 prevents the OS instance of one LPAR from accessing the resource of another LPAR in the SMP 100. Under normal operations, each OS instance running in an LPAR is totally unaware of the existence and details of the other LPARs residing in the same SMP.

The Hypervisor 108 has the global view of the SMP in terms of the number of LPARs residing in that SMP and the resources consumed by each LPAR. The Hypervisor 108 controls what hardware resources each LPAR can access. At the boot time of each LPAR, the Hypervisor 108 determines which/how much physical hardware resources (CPU time, Memory, and/or I/O devices, etc.) should be given to that LPAR, and allocates them so that the OS instance running in that LPAR can access those (and only those) hardware resources.

Whenever an LPAR wants more hardware resources, it will ask the Hypervisor, which then determines whether the extra resources can be given to the requesting LPAR, and allocates the resources if they are available. Each hardware resource has a granularity unit associated with it. For example, in IBM System p machines, the granularity unit for Processors is 1 Processing Unit (1 PU), which is equivalent to $\frac{1}{100}^{th}$ of a CPU 104; the granularity unit for memory is 1 Logical Memory Block (LMB) 107, which can vary from 16 MB to 256 MB, depending on the total memory size in the SMP 100; the granularity unit for I/O 106 is 1 I/O slot, which can span multiple hard disks or multiple physical adapter ports. The Hypervisor 108 keeps track of which units are allocated to which LPAR.

For the sake of the following discussion, it is assumed exemplarily that LPAR 101 serves the role of the ambLPAR in SMP 100 and that LPAR#1 102 is failing/failed.

The OS 109 (e.g., ambOS 109) in the ambLPAR 101 is basically dormant and consumes minimal resources until it is awakened to perform its role due to a failing/failed LPAR.

When another LPAR (e.g., LPAR 102) fails (e.g., gets "hung" or "crashes" or is otherwise distressed), some system monitoring software (either an agent of a remote Administration tool or the Hypervisor 108 running on the same SMP) will identify this condition and inform the Hypervisor 108. The Hypervisor then makes the failed LPAR's resources (e.g., memory, disks, and/or CPU states, etc.) accessible from the Ambulance LPAR such that the ambLPAR can diagnose the cause of the failure by, for example, analyzing the error logs and validating the kernel data structures.

In the ideal case, the ambOS will be able to fix the problem by modifying some kernel and/or other data structures. In all cases, however, a diagnosis report can be generated. This automatic diagnosis reporting capability will itself reduce the amount and time for problem diagnosis, even if the problem cannot be completely repaired automatically by the ambOS.

It is noted at this point, that the details for the diagnosis of a failing/failed OS are known in the art in the context of an OS diagnosing itself or the OS as being diagnosed manually by a technical expert. For example, an OS kernel will have routines to check and validate kernel data structures that are being used by itself, the running OS. These checker routines are periodically called to catch OS data structure corruptions as early as possible. Operating Systems also maintain error log entries to record any (hardware/software) component failure that occurred while the OS was running. Besides the checker routines, OS's come with tools that are used by technical experts to navigate and analyze the kernel and non-kernel data structures.

The present invention makes use of and extends these known techniques to an application wherein another OS party is made aware of a problem in an OS instance and takes appropriate action. Additionally, the validator routines are enhanced so that they can be used to analyze the kernel and non-kernel data structure from another OS instance.

With this mechanism and method, OS problem diagnosis will be greatly expedited and improved when an OS-instance in an LPAR fails, particularly in a Lights-out data-center or in a customer machine, whereby the ambLPAR gains access to most of the resources of the failed OS-instance. With the present invention, the amount of needed manual diagnosis, as well as the amount of time needed to diagnose a failing OS-instance, will be greatly reduced, hence greatly enhancing OS availability and robustness, which is very much in demand in these days of computerized eCommerce.

At a high level, the sequence of actions taken by the present invention is listed below:

1. An OS-instance running in an LPAR fails (crashes or becomes hung).
2. The hypervisor firmware or some other monitoring software will identify the failed LPAR and maps the resources of the failed LPAR (memory and I/O devices) to the ambLPAR.
3. The ambLPAR then takes over the resources of the failed LPAR, and performs diagnoses on the failed LPAR by validating kernel and other data structures in the mapped memory and I/O devices, and possibly fixes the errors discovered.
4. The ambLPAR can automatically send, to a predefined location or email address, the system dump diagnosis report, and/or a summary of the repair actions taken.
5. If the ambLPAR determines that the failed LPAR can now run again (after repairs), it will then inform the Hypervisor to reinstate the failed LPAR.

Figure 2:
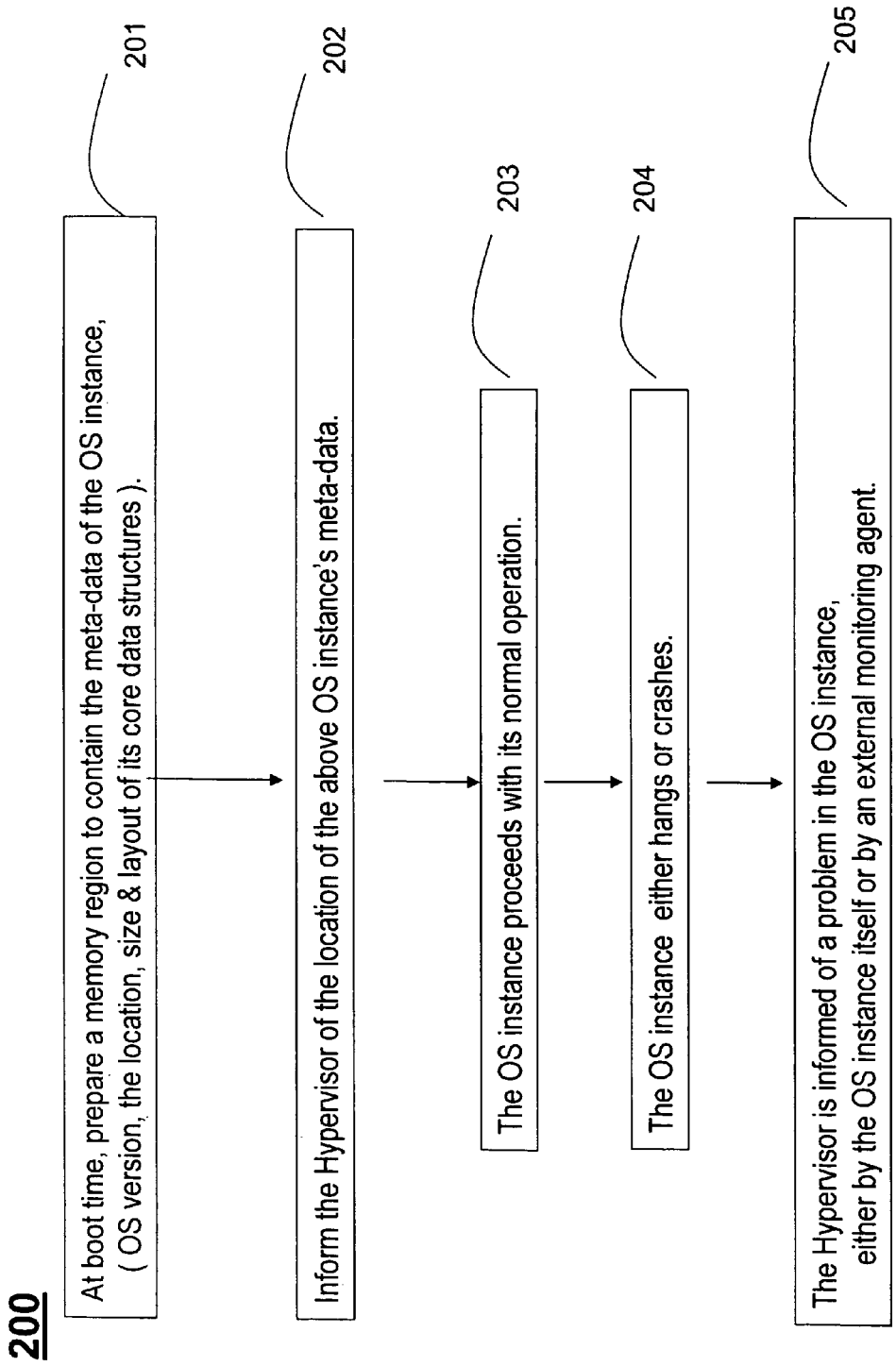
FIG. 2 shows an exemplary flowchart 200 of steps taken by an OS instance which wants to use the ambulance LPAR's services.

FIG. 2 illustrates an exemplary flowchart 200 of the actions taken by an OS instance (e.g., LPAR#1 in FIG. 1) which wants to utilize the services of the ambulance LPAR 101.

In step 201, each potentially-failing OS prepares a memory region for storing the meta-data of its kernel and non-kernel data structures, and other information that can assist the ambLPAR 101. This meta-data might include the version number of the failed OS instance, the sizes and layouts of its data structures, the location of the validator routines, etc. This step is done during the setup period of the potentially-failed OS instance. This step is required because a single ambulance LPAR typically serves multiple OS instances, which may run different versions of the OS. Since kernel and non-kernel data structures can be changed from one OS version to another, the ambLPAR expects the meta-data of the data structures to be provided by the failing OS instance, to enable ambOS to properly analyze those data structures.

In step 202, the OS instance provides this meta-data location to the Hypervisor firmware 108. In step 203, the OS instance proceeds with its normal course of operation after boot. In step 204, the OS instance crashes or hangs at some point. In step 205, Hypervisor is informed of the OS instance's failure, either by a system monitoring tool or by the OS instance itself.

Figure 3:
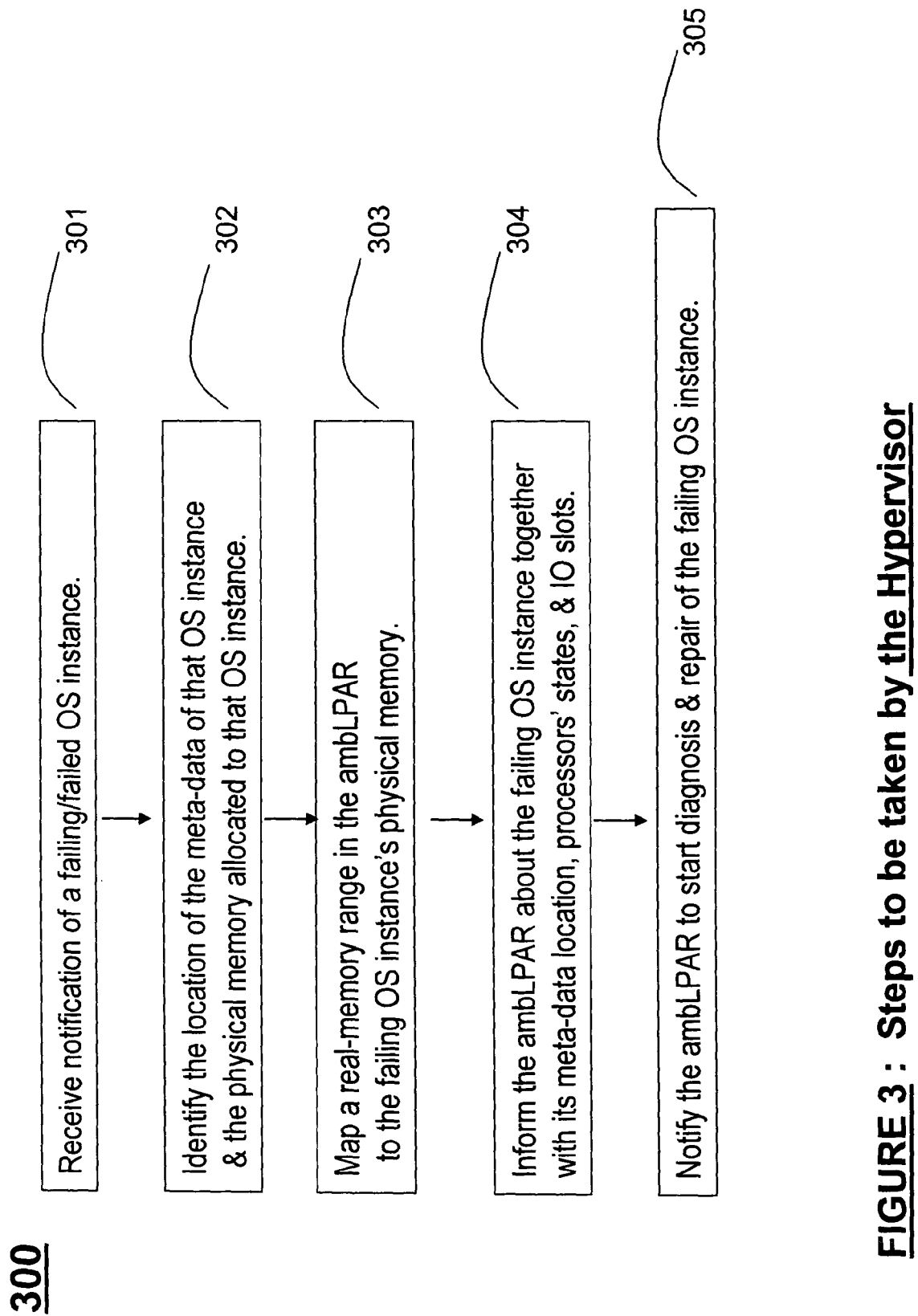
FIG. 3 shows an exemplary flowchart 300 of steps taken by a Hypervisor 108, which controls the access to hardware resources across the LPARs.

FIG. 3 shows an exemplary flowchart 300 of the steps to be taken by the Hypervisor 108. In step 301, the hypervisor 108 receives a notification of the failing OS instance 102. This notification can be given by either a system monitoring tool or by the OS instance itself, by calling a Hypervisor service before crashing.

In step 302, the hypervisor 108 identifies the location of the meta-data (OS-descriptor) and the physical memory allocated to that OS instance, as previously provided by the OS during its boot-up. In step 303, the hypervisor 108 assigns a real-memory range in the ambLPAR 101 to map for subsequent access to the failing OS instance's physical memory.

In step 304, the hypervisor 108 informs the ambLPAR 101 of the failing OS instance, its meta-data location, physical memory, and I/O slots owned by the failed OS. Finally, in step 306, the hypervisor asks the ambLPAR to start diagnosis and repair of the failed/failing OS instance.

Figure 4:
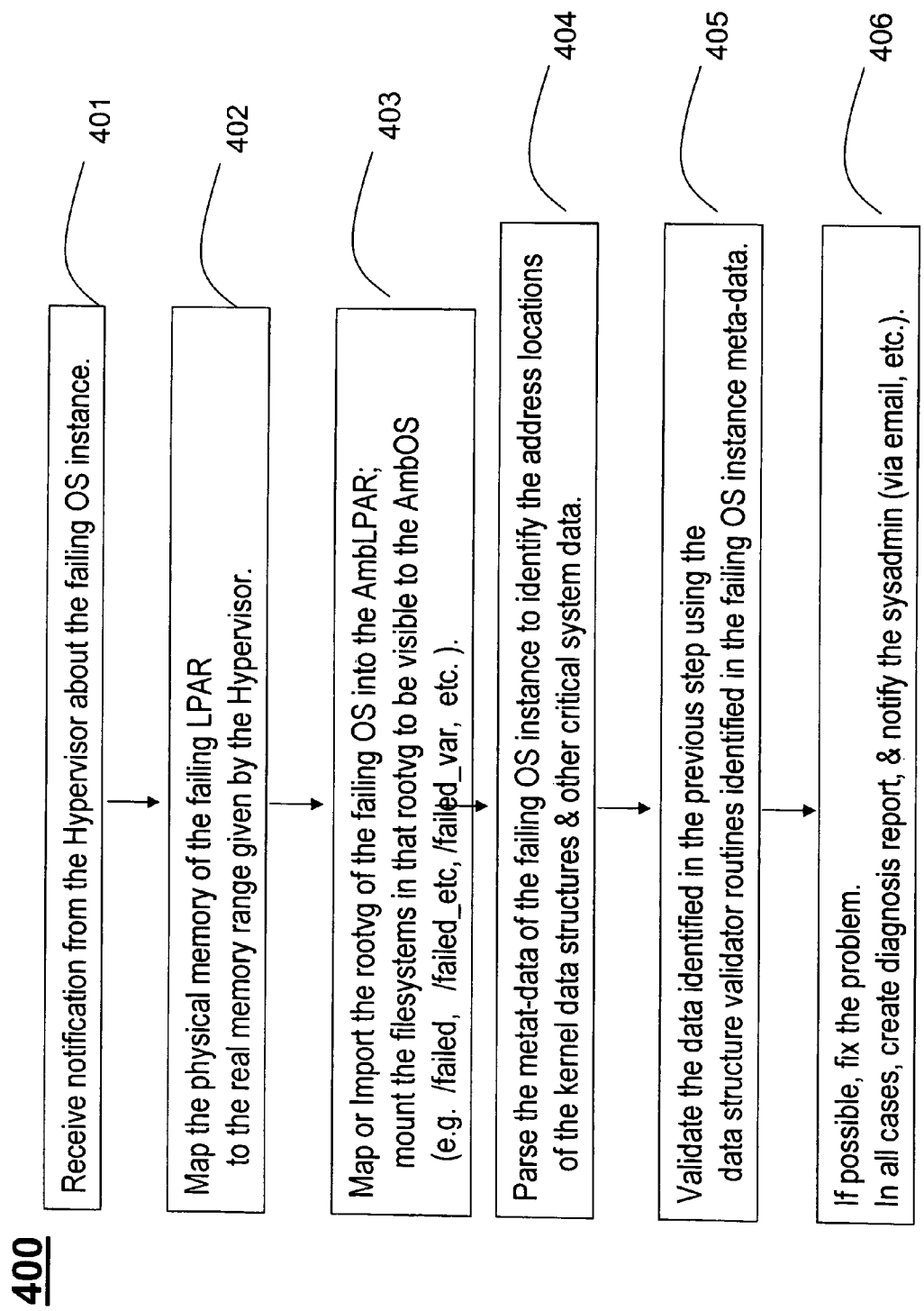
FIG. 4 shows an exemplary flowchart 400 of steps taken by the ambulance LPAR and its OS.

FIG. 4 shows an exemplary flowchart 400 of the actions taken by the ambPLAR 101. In step 401, the ambLPAR 101 receives notification about the failing OS instance 102 by the Hypervisor 108. In step 402, the ambPLAR 101 maps the physical memory of the failing LPAR 102 to the real memory range in the ambOS 109, as given by the hypervisor 108.

In step 403, the ambLPAR sets up the I/O devices being used by the failing OS so that they can be accessed from the ambLPAR 101. The ambLPAR initially sets up the access to the hard disk containing the failing OS's file systems, and then uses the ODM (Object Data Management) database of the failed OS to identify the list of configured devices in the failed OS. The ODM is a database of the configuration of devices and device methods of an OS instance.

In step 404, the ambPLAR identifies the address locations of the kernel data structures and other critical system data by reading the failing OS's meta-data. This step involves making the failing OS's data structures addressable from the ambOS, using the virtual addresses of the ambOS 109. An OS kernel typically uses predefined ranges of virtual addresses to access the core kernel data structures; but the same virtual addresses cannot be used from the context of the ambOS 109, as the ambOS uses the same virtual addresses to access its own data structures. This invention uses a mechanism to efficiently access the failing OS's data structures without using the same set of virtual addresses.

In step 405, the ambPLAR 101 validates the data identified in the previous step, including, if necessary, accessing the paging space on disks belonging to the failed OS instance.

In step 406, the ambPLAR 101 creates a diagnosis report and notifies the system administrator, perhaps by email, etc., and, if possible, fixes the problem, perhaps by correcting one or more of the data structures in the failed OS instance.

Moreover, although the present invention has been described above in the context of a Unix® environment, the concepts are more general, since the present invention teaches a mechanism wherein one OS-instance serves the role of providing an automatic diagnosis of a failure of another OS-instance. The OS can be of any type, e.g. Windows®, Longhorn®, Linux®, Solaris®, HP-UX®, i5OS®, etc.

Although the invention is described here in the context of a single SMP, it should be noted that the same principles can be applied to diagnose and repair a failing OS instance automatically from outside the SMP, by transferring the contents of the memory, processor states, and disk data, etc., to a remote "ambulance LPAR", meaning an auxiliary service system that provides the services similar to that described above for an SMP. It should be noted that the remote auxiliary service system might also be serving a machine having a single OS, rather than a plurality of OS-instances.

Although the present invention utilizes a full OS instance to carry out Ambulance functionality (diagnosis and repair), that functionality can also be provided by firmware (e.g., a Hypervisor) instead of a full-blown (complete) OS. The present invention can also be used in the environment of a virtual machine that uses partitions, each having its respective operating system instance.

From the discussion above, it can be readily recognized that the present invention will be able to greatly reduce the amount of manual diagnosis of a failing OS-instance. The amount of time needed to diagnose a failing OS-instance will also be greatly reduced, and OS availability will be improved. Moreover, the automatic problem diagnosis, reporting, and problem-fixing features of this invention are essential features needed to run Lights-Out data centers, which are becoming increasingly prevalent.

Exemplary Hardware Implementation

Figure 5:
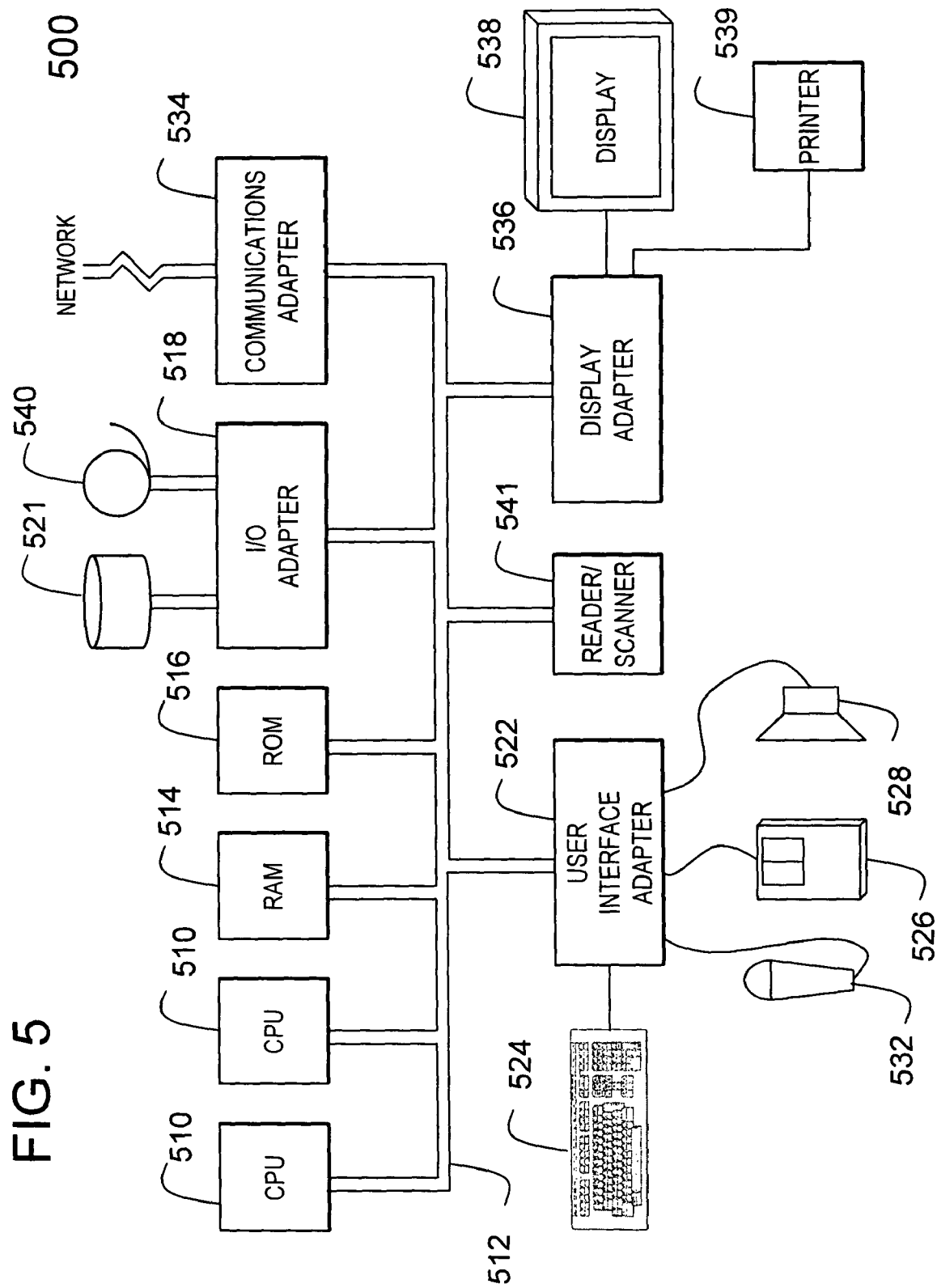
FIG. 5 illustrates an exemplary hardware/information handling system 500 for incorporating the present invention therein.
Figure 6:
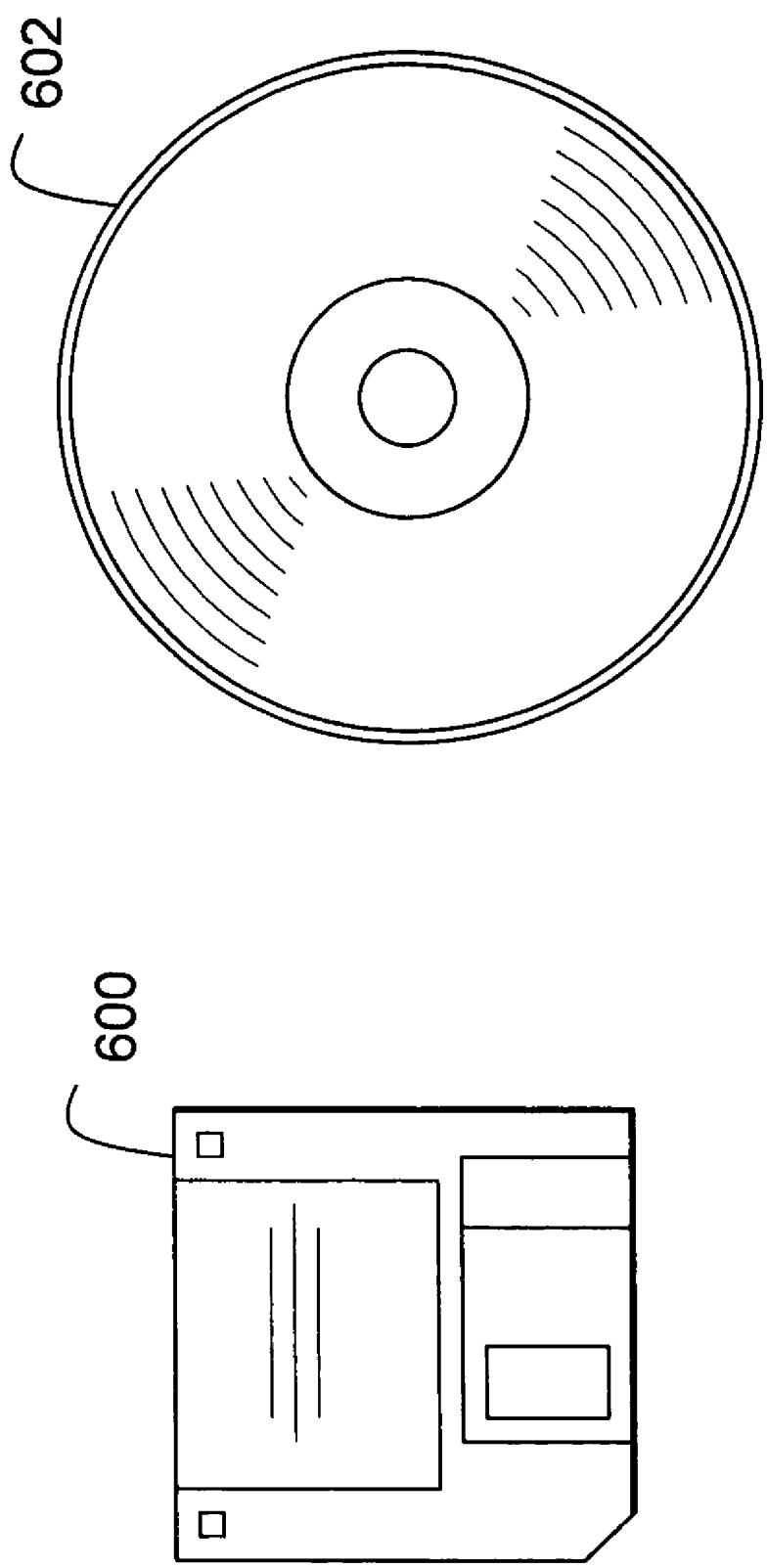
FIG. 6 illustrates a signal-bearing medium 600 (e.g., storage medium) for storing steps of a program of a method according to the present invention.

FIG. 5 illustrates a typical hardware configuration of an information handling/computer system in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device 602 (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of an exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A diagnosis mechanism for a computer system, comprising:
   an auxiliary service system capable of gaining access to resources of a failed or failing operating system running on a computer system capable of supporting a plurality of concurrently-running operating system instances, each said operating system instance owning or sharing one or more processing elements, a certain amount of memory, and one or more input/output (I/O) devices, and automatically diagnosing the failed or failing operating without affecting a functioning of other instances of operating system concurrently operating on said computer system,
   wherein said computer system comprises a Symmetric Multi-Processor (SMP), wherein said concurrently-running operating system instances and said auxiliary service system each occupies a respective Logical PARtition (LPAR), said auxiliary service system comprises an ambulance service LPAR, and said LPARs are controlled by a hypervisor,
   wherein each said operating system instance, during an initial booting procedure, prepares a memory region for storing metadata of its kernel and non-kernel data structures and other information that can potentially assist said auxiliary service system during a failure of said operating system instance, said operating system instance providing a location of said memory region to said hypervisor before beginning a normal course of operation after said initial booting procedure,
   machine-readable instructions permitting said auxiliary service system to identify locations of at least one of kernel structures and other data structures in a distressed operating system,
   wherein said auxiliary system further comprises at least one data structure validator that validates values of said at least one of kernel structures and data structures.

2. The diagnosis mechanism of claim 1, wherein said auxiliary service system is further capable of at least one of:

repairing said operating system;

annunciating that said operating system requests servicing; and providing a report of said diagnosing.

3. The diagnosis mechanism of claim 1, wherein said auxiliary service system comprises an operating system instance of said plurality of concurrently-running operating system instances, an operating system of said auxiliary service system being substantially dormant until invoked to perform said diagnosing on a distressed operating system instance in said computer system.

4. The diagnosis mechanism of claim 1, wherein said computer system comprises a computer system in a lights-out data service center.

5. The diagnosis mechanism of claim 1, wherein said hypervisor, upon becoming aware of a failed or failing operating system instance, informs the auxiliary service system of the location of the prepared memory region storing the metadata of the failed or failing operating system instance.

6. The diagnosis mechanism of claim 1, further comprising:

an access granting mechanism permitting said auxiliary service system access to resources of said operating system instances, including said one or more processing elements, memory, and I/O devices of each said operating system instances.

7. The diagnosis mechanism of claim 6, wherein said access granting mechanism further comprises:

machine-readable instructions to identify physical memory address ranges and I/O devices owned by a distressed operating system instance.

8. The diagnosis mechanism of claim 6, wherein said access granting mechanism further comprises:

machine-readable instructions to map a memory from a distressed operating system instance and to add the memory to the auxiliary service system without modifying contents of the memory.

9. The diagnosis mechanism of claim 6, wherein said access granting mechanism further comprises:

machine-readable instructions to map or mount filesystems in the I/O devices of a distressed operating system instance to the auxiliary service system.

10. The diagnosis mechanism of claim 6, further comprising a set of messages comprising one or more of:

a message from said access granting mechanism to said auxiliary service system notifying the auxiliary service system of an operating system instance in distress;

a message from said access granting mechanism to said auxiliary service system, informing said auxiliary service system of physical memory locations used by the distressed operating system instance; and a message from said access granting mechanism to said auxiliary service system informing said auxiliary service system about the I/O devices accessed by the distressed operating system instance.

11. The diagnosis mechanism of claim 6, further comprising:

a set of messages exchanged between said operating system instances and said access granting mechanism.

12. The diagnosis mechanism of claim 11, said auxiliary service system comprising:

an auxiliary service system operating system; and a memory management subsystem that maps a physical memory of a distressed operating system instance into a virtual address space of said auxiliary service system operating system.

13. The diagnosis mechanism of claim 12, wherein said auxiliary service system further comprises:

an I/O management system capable of mapping storage devices belonging to the distressed operating system instance accessible from the auxiliary service system.

14. An automated method of diagnosis in a computer system capable of supporting a plurality of operating system instances concurrently operating, each said operating system instance owning or sharing one or more processing elements, a certain amount of memory, and one or more input/output (I/O) devices, said method comprising:

running an auxiliary service system on said computer system, said auxiliary service system capable of automatically diagnosing an operating system instance running on said computer system without affecting an operation of remaining operating system instances, wherein said computer system comprises a Symmetric Multi-Processor (SMP), wherein said plurality of operating system instances and said auxiliary service system each occupies a respective Logical PARtition (LPAR), said auxiliary service system comprises an ambulance service LPAR, and said LPARs are controlled by a hypervisor, wherein each said operating system instance, during an initial booting procedure, prepares a memory region for storing metadata of its kernel and non-kernel data structures and other information that can potentially assist said auxiliary service system during a failure of said operating system instance, said operating system instance providing a location of said memory region to said hypervisor before beginning a normal course of operation after said initial booting procedure; and executing machine-readable instructions, upon detecting that an operating system instance has failed or potentially will fail, permitting said auxiliary service system to identify locations of at least one of kernel structures and other data structures in said failed or potentially failing operating system instance, wherein said auxiliary service system further comprises at least one data structure validator, said method further comprising using said data structures to validate values of said at least one of kernel structures and data structures.

15. The automated method of claim 14, said auxiliary service system further capable of at least one of:

repairing an operating system instance running on said computer system;

annunciating that an operating system instance running on said computer system is requesting servicing; and providing a report of said diagnosing.

16. The automated method of claim 14, further comprising:

permitting said auxiliary service system access to resources of said operating system instance, including said one or more processing elements, memory, and I/O devices of said operating system instance.

17. A tangible signal-bearing storage medium tangibly embodying a program of machine-readable instructions executable by a digital processing apparatus to perform an automated method of diagnosis in a computer system, said method comprising:

running an auxiliary service system on said computer system capable of concurrently operating a plurality of operating system instances, said auxiliary service system capable of diagnosing a failed or failing operating system instance running on said computer system without affecting an operation of remaining instances of said plurality of operating system instances, wherein said computer system comprises a Symmetric Multi-Processor (SMP), wherein said plurality of operating system instances and said auxiliary service system each occupies a respective Logical PARtition (LPAR), said auxiliary service system comprises an ambulance service LPAR, and said LPARs are controlled by a hypervisor, wherein each said operating system instance, during an initial booting procedure, prepares a memory region for storing metadata of its kernel and non-kernel data structures and other information that can potentially assist said auxiliary service system during a failure of said operating system instance, said operating system instance providing a location of said memory region to said hypervisor before beginning a normal course of operation after said initial booting procedure; and permitting said auxiliary service system to identify locations of at least one of kernel structures and other data structures in a distressed operating system, wherein said auxiliary system further comprises at least one data structure validator that validates values of said at least one of kernel structures and data structures.

18. The storage medium of claim 17, said auxiliary service system further capable of at least one of:

repairing an operating system instance running on said computer system;

annunciating that an operating system instance running on said computer system is requesting servicing; and providing a report of diagnosing said operating system instance.

19. The storage medium of claim 17, wherein said computer system is capable of supporting a plurality of operating system instances, each said operating system instance owning or sharing one or more processing elements, a certain amount of memory, and one or more input/output (I/O) devices, said method further comprising:

permitting said auxiliary service system access to resources of said operating system instance, including said one or more processing elements, memory, and I/O devices of said operating system instance.

20. The storage medium of claim 17, said method further comprising:

mapping a physical memory of a distressed operating system instance into a virtual address space of an operating system in said auxiliary service system.

21. A computer system, comprising:

means for setting up and maintaining a plurality of concurrently-running operating system instances, each said operating system instance owning or sharing one or more processing elements, a certain amount of memory, and one or more input/output (I/O) devices; and an automatic diagnosis mechanism capable of at least one of diagnosing an operating instance running on said computer system, repairing an operating system instance running on said computer system, annunciating that an operating system instance running on said computer system is requesting servicing, and providing a report of diagnosing said operating system instance, without affecting an operation of any other instances of said concurrently-running operating system instances, wherein said computer system comprises a Symmetric Multi-Processor (SMP), wherein each of said plurality of concurrently-running system instances and said automatic diagnosis mechanism occupies a respective Logical PARtition (LPAR), said auxiliary service system comprises an ambulance service LPAR, and said LPARs are controlled by a hypervisor, wherein each said operating system instance, during an initial booting procedure, prepares a memory region for storing metadata of its kernel and non-kernel data structures and other information that can potentially assist said auxiliary service system during a failure of said operating system instance, said operating system instance providing a location of said memory region to said hypervisor before beginning a normal course of operation after said initial booting procedure, said automatic diagnosis mechanism comprising machine-readable instructions permitting said auxiliary service system to identify locations of at least one of kernel structures and other data structures in a distressed operating system, wherein said auxiliary system further comprises at least one data structure validator that validates values of said at least one of kernel structures and data structures.

22. The computer system of claim 21, as comprising a component in a lights-out data center.

23. A method of at least one of operating a data center and using a data center, said method comprising:

at least one of transmitting data to a computer system in said data center and receiving data from said computer system, wherein said computer system in said data center has provisions to set up and maintain a plurality of concurrently-running operating system instances, each said operating system instance owning or sharing one or more processing elements, a certain amount of memory, and one or more input/output (I/O) devices, said computer system further comprising an automatic diagnosis mechanism capable of at least one of diagnosing an operating instance running on said computer system, repairing an operating system instance running on said computer system, annunciating that an operating system instance running on said computer system is requesting servicing, and providing a report of diagnosing said operating system instance, without affecting an operation of remaining instances of said plurality of concurrently-running operating system instances, said automatic diagnosis mechanism comprising machine-readable instructions permitting said auxiliary service system to identify locations of at least one of kernel structures and other data structures in a distressed operating system, wherein said auxiliary system further comprises at least one data structure validator that validates values of said at least one of kernel structures and data structures;

wherein said computer system comprises a Symmetric Multi-Processor (SMP), wherein said plurality of concurrently-running operating system instances and said auxiliary service system each occupies a respective Logical PARtition (LPAR), said auxiliary service system comprises an ambulance service LPAR, and said LPARs are controlled by a hypervisor, wherein each said operating system instance, during an initial booting procedure, prepares a memory region for storing metadata of its kernel and non-kernel data structures and other information that can potentially assist said auxiliary service system during a failure of said operating system instance, said operating system instance providing a location of said memory region to said hypervisor before beginning a normal course of operation after said initial booting procedure.

24. The method of claim 23, wherein said data received from said computer system comprises said report of said diagnosing said operating system instance.

25. The method of claim 23, wherein said data transmitted to said computer system or received from said computer system comprises data that is not related to a maintenance of said computer system.

* * * * *